United States Patent [19]
Jespersen

[11] 3,776,325
[45] Dec. 4, 1973

[54] ALL-TERRAIN VEHICLE

[75] Inventor: Herbert A. Jespersen, Lincoln, Nebr.

[73] Assignee: Outboard Marine Corporation, Waukegan, Ill.

[22] Filed: Nov. 27, 1970

[21] Appl. No.: 93,471

Related U.S. Application Data

[62] Division of Ser. No. 857,494, Sept. 12, 1969, abandoned.

[52] U.S. Cl.................. 180/6.48, 74/471, 180/6.7, 180/77 H
[51] Int. Cl........................................... B62d 11/04
[58] Field of Search.................. 180/6.3, 6.48, 6.7, 180/77 H; 74/471, 730; 60/52 US, 53 A, DIG. 5

[56] References Cited
UNITED STATES PATENTS

| | | | |
|---|---|---|---|
| 2,833,361 | 5/1958 | Schwartz............................. | 180/6.48 |
| 2,036,437 | 4/1936 | Ruediger............................ | 180/6.7 X |
| 3,431,993 | 3/1969 | Case .................................. | 180/6.48 |
| 3,385,255 | 5/1968 | Raymond et al............... | 180/6.48 X |
| 2,359,758 | 10/1944 | Hamren ............................ | 180/6.48 |
| 3,181,389 | 5/1965 | Richard ............................ | 74/471 X |

Primary Examiner—Kenneth H. Betts
Assistant Examiner—Leslie J. Paperner
Attorney—Wheeler, Wheeler, House and Clemency

[57] ABSTRACT

Disclosed herein is an all-terrain vehicle including a body, a power generating and transmission group, and a track suspension group, each of which can be separately initially fabricated and subsequently assembled. After assembly of the power generating and transmission group and the track suspension group to the body, a motor hood, drive sprocket, and tracks may additionally be assembled to complete the vehicle.

Also disclosed herein is a track suspension system affording both transverse and lateral resiliently flexible support to an endless track and a releasably locked and pivotally mounted rear bogie wheel assembly which, when pivoted from its normal operating position, affords assembly of or removal of the endless track relative to the sprocket and bogie wheels.

Also disclosed herein is a track sprocket affording maximum open area for the escape of mud, snow, ice and the like.

Also disclosed herein is a hydrostatic transmission including a control having a reverse lock-out preventing accidental movement of the control into position effecting reverse operation.

Still further, there is disclosed herein a hydraulic oil circulating system which utilizes the gear box as a sump for the circulating system and which is in heat exchanging relation with an air circulating system.

7 Claims, 18 Drawing Figures

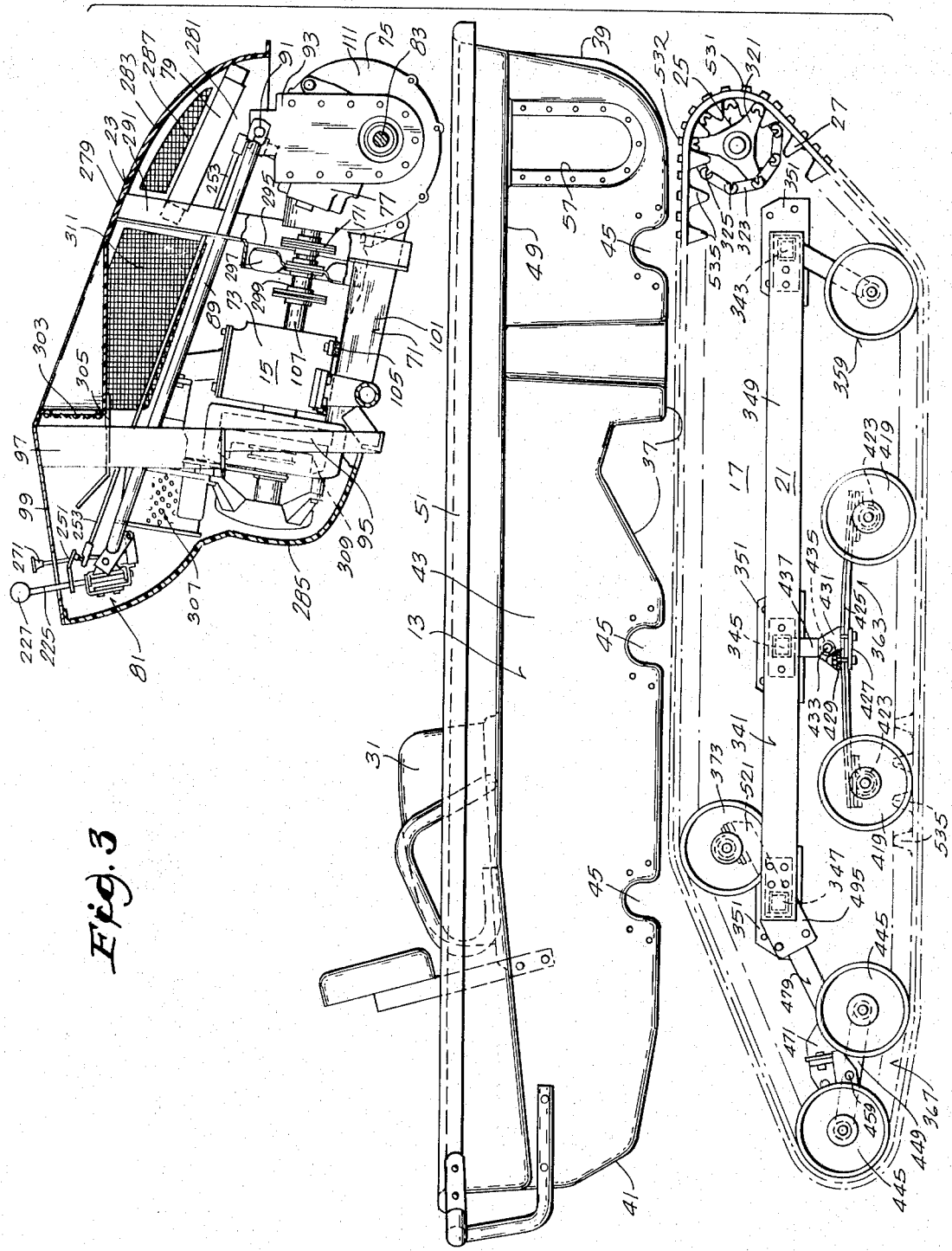

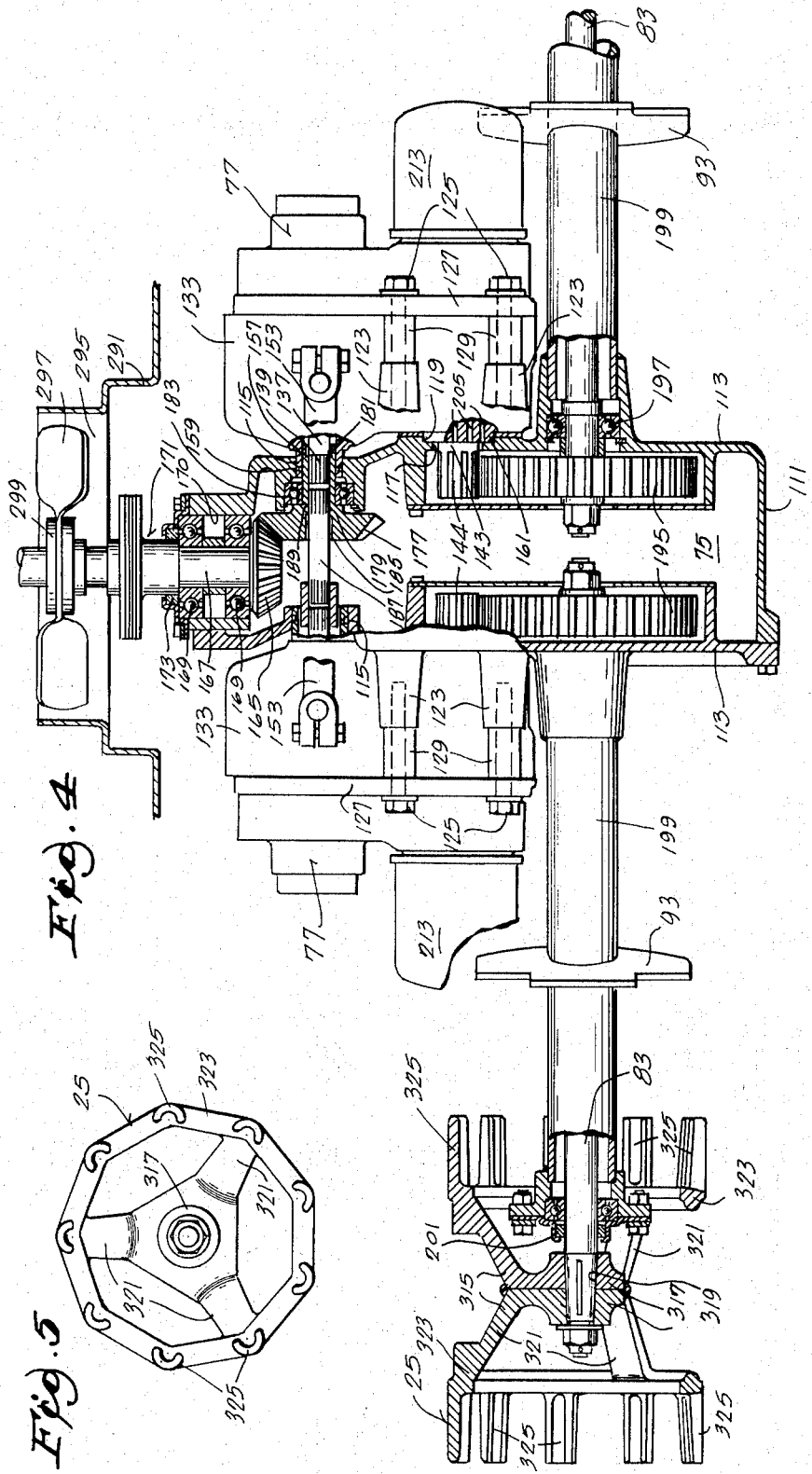

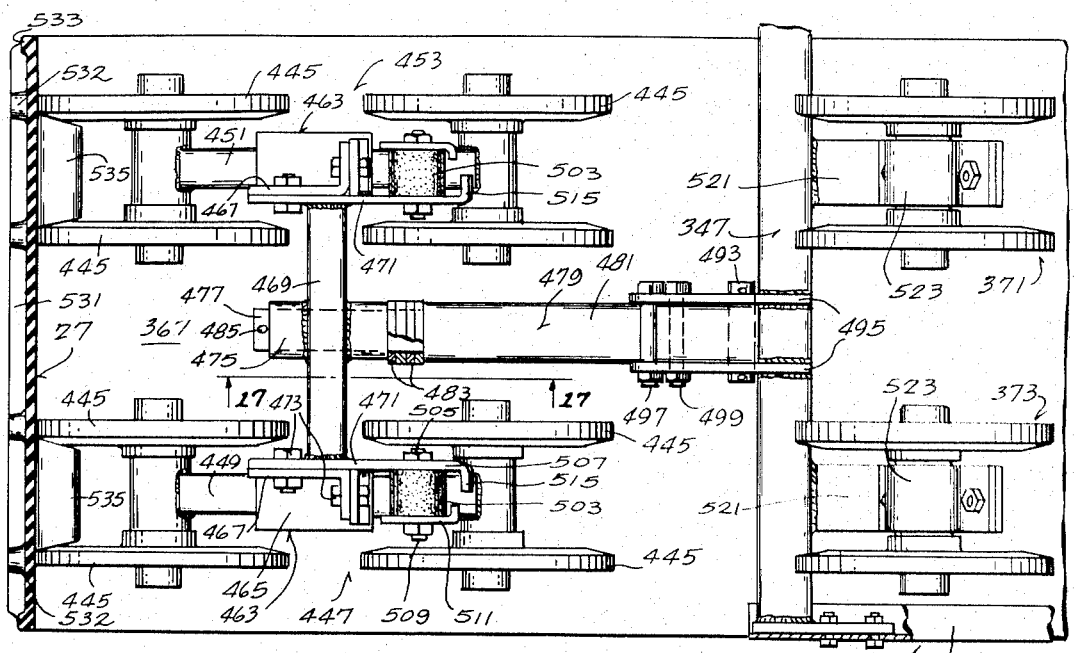
FIG.15
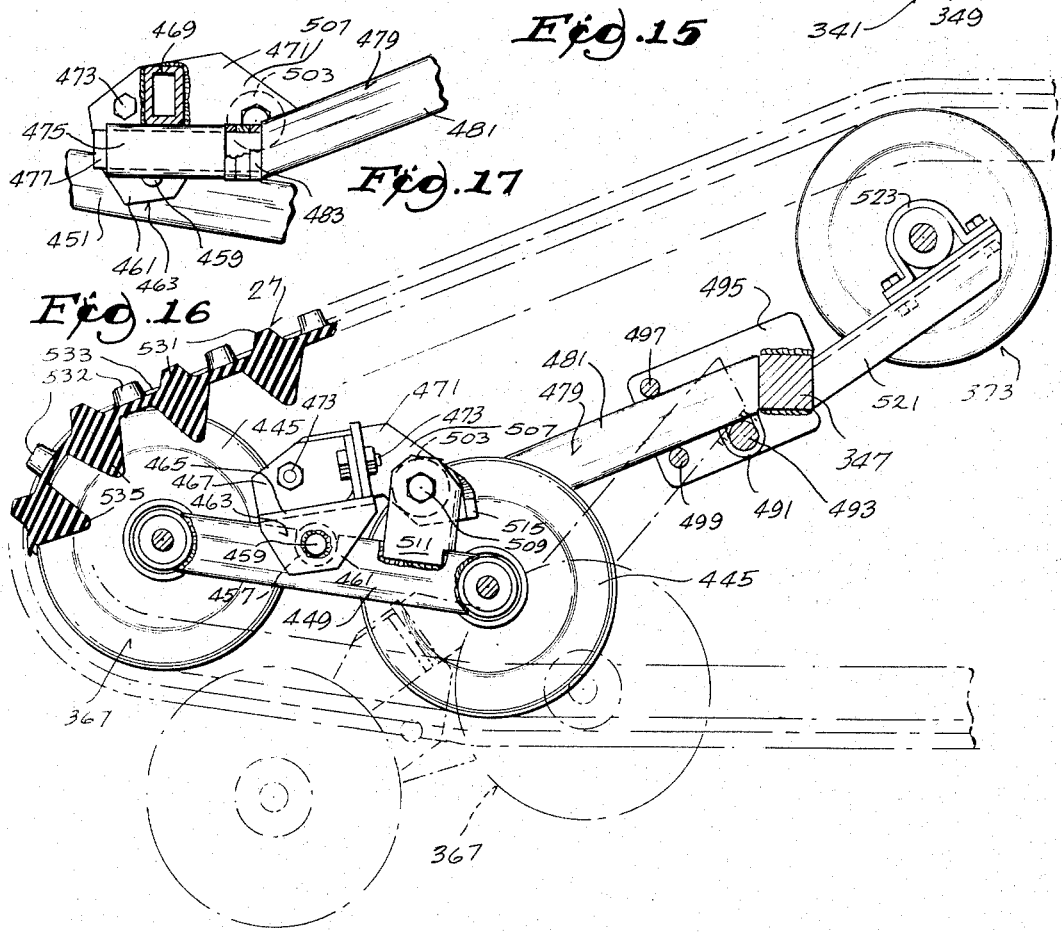
FIG.17
FIG.16

ALL-TERRAIN VEHICLE

RELATED CASE

This application is a division of my co-pending application Ser. No. 857,494, filed Sept. 12, 1969, abandoned in favor of continuing application Ser. No. 175,376, now U.S. Pat. No. 3,688,858.

BACKGROUND OF THE INVENTION

The invention relates to so-called all-terrain vehicles which have a high capability for travel over difficult and rough ground contours, conditions and textures. The invention also relates to track vehicles and especially to vehicles adapted to travel over snow and mud. The invention further relates to modular construction of such vehicles.

The invention further relates to sprocket constructions and to track suspensions. In connection with sprocket constructions, reference is made to U.S. application Ser. No. 685,214, now U.S. Pat. No. 3,472,563.

The invention further relates to speed and steering controls and, in this connection, reference is made to U.S. Pat. No. 644,853 and No. 3,323,607.

The invention further relates to power generating and transmission systems and to air and oil circulating systems for hydraulically driven track or other vehicles and to cooling arrangements for such systems.

SUMMARY OF THE INVENTION

The invention provides a superior all-terrain vehicle capable of reliable performance over a wide range of ground conditions. One of the features of the invention resides in the modular arrangement or construction whereby major components of the vehicle can be separately fabricated and subsequently assembled as a whole.

More specifically, the main components of the disclosed all-terrain vehicle include a body, a power generating and transmission group and a track suspension group, each of which can be separately fabricated for future independent assembly with the body, thereby materially reducing the complexity of assembling and fabricating and facilitating ease of assembly and ready replacement in the case of need for repair or the like.

Another of the features of the modular concept involves the use of conventional hydraulic or hydrostatic transmission units which can be readily connected to or removed from a gear box to provide superior transmission operation and to afford ease of assembly and replacement.

Another of the features of the invention resides in the control system for the power generating and transmission group which includes a pair of hydrostatic transmission units powered by a single internal combustion engine. The control system includes a T-bar stick controlling operation of the hydraulic transmission units to provide conditions of neutral, forward and reverse drive, as well as steering, together with a reverse lockout arrangement to prevent accidental operation in reverse.

Still another feature of the invention resides in the hydraulic circulation system which utilizes the before-mentioned gear box as the sump or reservoir for oil discharged from the hydrostatic units, thereby economically providing for lubrication of the various components within the gear box.

Still another aspect of the invention resides in the dual flow air circulation system for cooling the oil circulation system and for supplying combustion air to the engine, as well as for cooling of the engine.

Still another feature of the invention resides in the track suspension group whereby both lateral and longitudinal resilient support is provided for an endless belt or track. In this regard, the track suspension assembly, at each side of the vehicle body, includes a plurality of paired inner and outer bogie wheels which are located in generally adjacent transverse relation to each other and which are supported for vertical movement independently of each other, whereby to afford resilient transverse flexible support for the endless belts.

In addition to the foregoing, each track assembly includes a rear bogie wheel assembly which is pivotally mounted to the supporting frame so as to afford displacement of the rear bogie wheels to a position conveniently affording placement of the endless track about the drive sprocket and around the bogie wheel assemblies. Upon such assembly, the rear bogie wheel assembly is swung back into its normal operating position and releasably locked in place to prevent loss of the endless track from the suspension assembly.

Another of the aspects of the rear bogie wheel construction is the arrangement for maintaining track tension, notwithstanding any stretch or elongation which may occur to the track.

Still another feature of the rear bogie wheel assembly is the arrangement of an elastomeric mount to afford limited resilient movement of the rear bogie wheels from their normal operating position.

Still another feature of the invention is the drive sprocket construction which is arranged to afford a maximum opportunity for escape of ice, snow, mud, or the like, which otherwise could have a tendency to build up on the sprocket.

Still another feature of the invention resides in the general arrangement of the various bogie wheels to the frame of the track suspension group and the arrangement for connection of the track suspension group to the body.

Still another feature of the invention resides in the relationship between the bogie wheel sprocket diameter and the lugs and the inside of the endless track. More specifically in this regard, the lugs and the discs are dimensioned such that, at least two teeth are always engaged within each bogie wheel during movement of the track, thereby reliably assuring retention of the track in proper aligned relation to the associated track suspension system.

In general, the principal object of the invention is to provide a superior all-terrain vehicle which is economical to manufacture and assemble, which can be readily repaired, and which is entirely reliable in operation.

Other objects and advantages of the invention will become known by reference to the following description and accompanying drawings in which:

DRAWINGS

FIG. 3 is an exploded elevational view, partially broken away in section, of the power generating and transmission group, the body, and the track suspension group of the vehicle shown in FIG. 1.

FIG. 4 is an enlarged and partially broken away view of a portion of the power generating and transmission group and of the drive sprocket employed in the vehicle shown in FIG. 1.

FIG. 5 is an end view of the sprocket shown in FIG. 4.

FIG. 15 is a plan view, partially in section, of the rear bogie wheel assembly of the track suspension group.

FIG. 16 is an end elevational view, partially in section, of the rear bogie wheel assembly shown in FIG. 15.

FIG. 17 is a sectional view taken along line 17—17 of FIG. 15.

GENERAL DESCRIPTION

Figure 1:
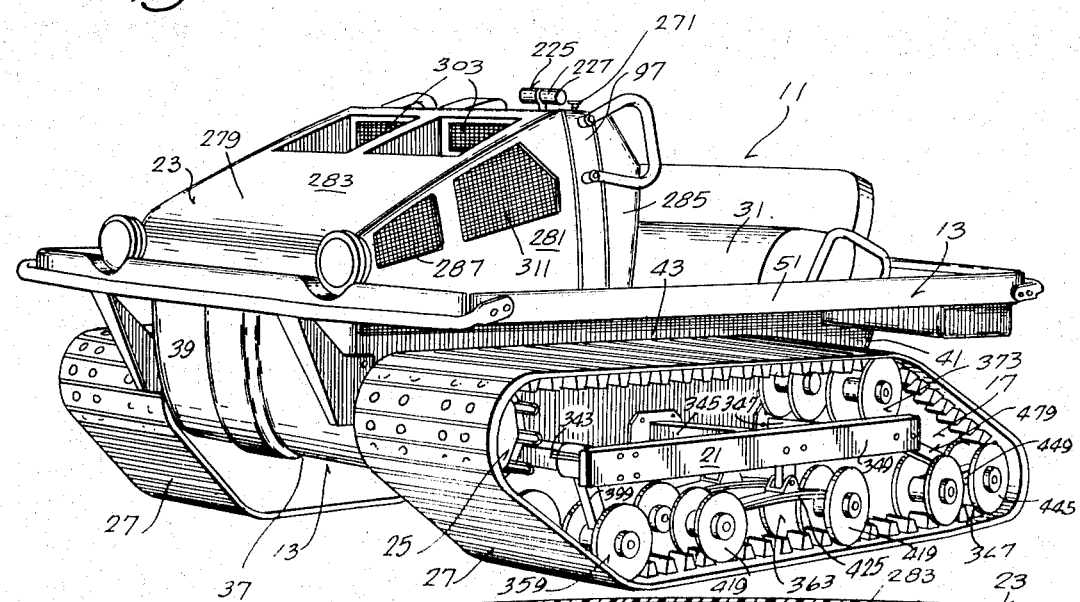
FIG. 1 is a perspective view of a track vehicle embodying various of the features of the invention.

Shown in the drawings and especially in FIG. 1, is an all-terrain vehicle 11 built in accordance with the invention. The vehicle is desirably constructed by assembling three main assemblies or modules (See FIG. 3), namely, a body 13, a power generating and transmission group 15, and a track suspension group 17 which includes, on each side of the vehicle, a track suspension system 21. In addition to the foregoing, full construction of the vehicle is generally completed by assembling a motor hood 23 over the power group and by connecting a pair of sprockets 25 to the power group and by training an endless longitudinal and transversely flexible track 27 around the sprocket 25 and track suspension system 21 at each side of the vehicle 11.

THE BODY

The vehicle body 13 is preferably molded of fiberglass, although other constructions and materials can be employed, to provide an upwardly open hollow interior which receives the power group 15 and which supports the motor hood 23 and a seat 31 (See FIG. 1), as well as other components not specifically referred to.

Figure 2:
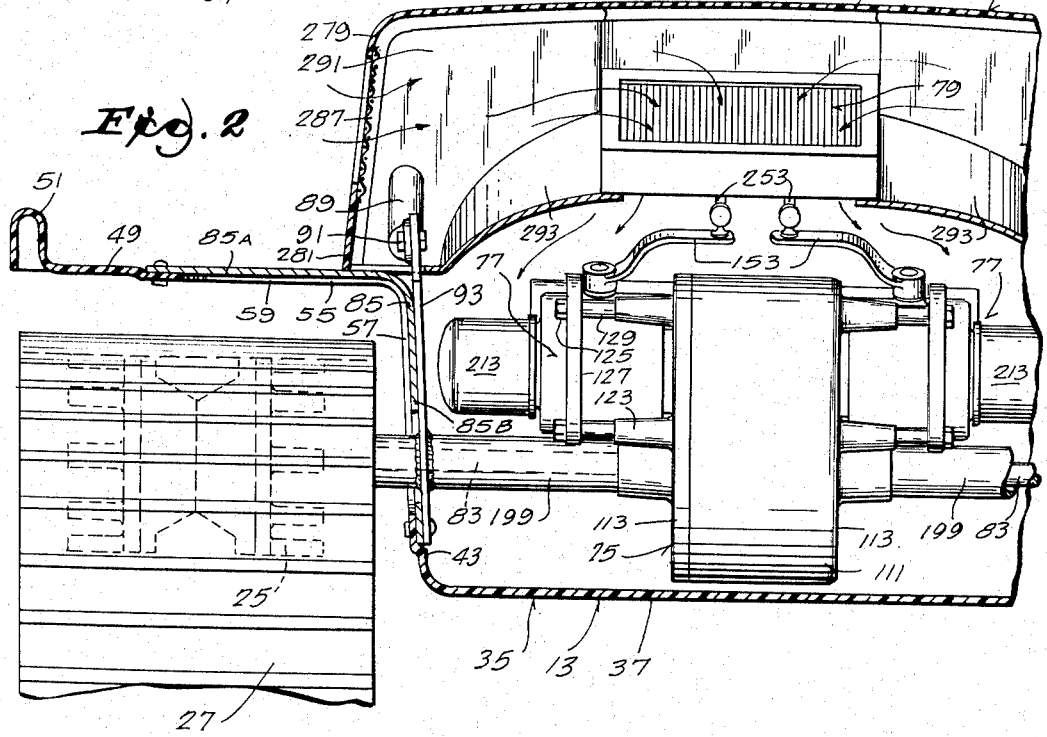
FIG. 2 is a sectional view taken transversely of the forward portion of the vehicle shown in FIG. 1.

More specifically, the body includes, see FIG. 2, a center section 35 having a bottom wall 37 and front and rear walls 39 and 41 respectively extending upwardly from the bottom wall 37. Extending from the bottom wall 37 and from the front and rear walls 39 and 41 are opposing side walls 43 which, together with the bottom, front and rear walls, generally complete the center section 35.

Located transversely on the undersurface of the bottom wall 37 (See FIG. 3) are a plurality of spaced parallel downwardly open channels 45 which are formed in the otherwise generally continuous bottom wall surface. As explained in greater detail hereinafter, the channels 45 cooperate with the track suspension group 17 to permit modular assembly while, at the same time, affording maximum vertical clearance under the bottom wall 37 and between the tracks 27, consistent with maintaining watertight integrity of the body and maximum depth to afford sufficient space in the center section 35 for the power group 15 and for the user's legs. While various arrangements are possible, the disclosed construction includes forward, rearward, and intermediate channels.

Extending oppositely and laterally outwardly from the upper portion of each of the side walls 43 are (See FIG. 2) deck or extension walls 49 which, along their outer peripheries, have upwardly extending flanges 51 which merge with the front and rear walls 39 and 41.

Except for a pair of opposed and aligned openings 55 (See FIG. 2), which will shortly be described, and except as may otherwise be indicated herein, the resulting construction is generally continuous and therefor generally watertight to adjacent the top edges of the front wall, rear wall and flanges.

Each of the opposed and aligned openings 55 is provided, as will be explained in greater detail hereinafter, to facilitate assembly of the power group 15 with the body 13, and includes a part 57 in the associated side wall 43 and a part 59 in the adjacent associated deck wall 49. More particularly, the side wall part 57 of each opening 55 extends from upwardly of the bottom of the associated side wall 43 to the adjacent deck wall 49 and the deck wall part 59 extends inwardly of the outer periphery thereof to the side wall part 57 to provide, with the adjacent side wall part, a continuous opening.

The body 13 can be provided with one or more vertical openings, as may be desired, to afford passage of items such as an exhaust pipe which can extend through the bottom of the vehicle and then rearwardly. Such vertical openings can be defined by a cylinder wall having a height above the bottom wall 37 approximately the same as the height of the top edges of the front wall, rear wall, and flanges, whereby such vertical openings do not detract from the watertight integrity of the body.

THE POWER GENERATING AND TRANSMISSION GROUP

The power generating and transmission group 15 principally includes (as seen best in FIG. 3) a frame 71 which is connectable to the body 13, an engine 73, and a transmission system including a gear case or box 75. Both the engine 73 and the gear box 75 are connected to the frame 71 and can, in part, be considered as part of the frame. Other principal components of the power group include a pair of hydraulic or hydrostatic transmission units 77 which are connected to the gear box 75, and a radiator 79 which is supported above the gear box 75 at the front of the power group 15, and a hydraulic transmission control system 81 which regulates the hydrostatic transmission units to afford speed and steering operation. In addition, the power group includes a separate control for engine speed.

Extending from the gear box 75 is an axle means which, in the disclosed construction, is in the form of two generally axially aligned shafts 83. Associated with each of the axle shafts 83 to span the previously disclosed body openings 55 are respective L-shaped closures 85 which have contours conforming generally to the margins of the inner surface of the body 13 around the openings 55 and which include deck and side wall portions or legs 85A and 85B.

More particularly, the frame 71 can be suitably constructed in any desired way and is arranged to be suitably connected, as by bolts or the like, to the body. More specifically, as shown best in the upper part of FIG. 3, the frame 71 includes a central generally horizontally extending forwardly open U-shaped member 89 which, at its forward ends, is connected by bolts 91 or otherwise (See FIG. 2) to plates 93 welded on extensions of the gear box 75. Adjacent its rearward end, the frame 71 includes a generally vertically extending box frame member 95 which is connected to the horizontally extending U-shaped member 89. Connected to the upper sides of the box member are vertically extending exterior panels 97. The top of the box shaped member 95 supports a dashboard or instrument panel 99. The bottom of the box shaped member 95 lies across the bottom wall 37 of the body center section 35 and is suitably attached thereto. Extending forwardly from the bottom of the box shaped member 95 (See FIG. 3) is a channel member 101 which supports the engine 73, and which, at its forward end, is bolted to the gear box 75.

TRANSMISSION SYSTEM

The transmission system is powered by the engine 71 and includes (See FIGS. 2 and 3) a housing 111 which constitutes both the gear box 75 and an oil reservoir and which has opposing sides upon which are detachably mounted the hydraulic or hydrostatic transmission units 77. It is to be noted that one of the facets of the modular feature of the invention resides in the ease of assembly and ready replacement of the hydrostatic units 77 relative to the gear box 75.

Further in regard to the gear box construction which affords ready receipt of the hydrostatic units, the gear box sides 113 each include (See FIG. 4) respective aligned openings 115 adapted to mate with the hydrostatic units 77 and to afford transfer of power from the gear box 75 to the hydrostatic units 77. In addition, the gear box sides 113 also each include respective openings 117 to afford passage of the output shaft (still to be described) of the associated hydrostatic unit 77. Each such opening 117 has an outer counterbore 119 which mates with the associated hydrostatic unit 77 and serves as a pilot to afford proper alignment.

In addition, the gear box housing 111 includes means for detachably connecting thereto the hydrostatic units 77. While various arrangements can be employed, in the disclosed construction, such means includes a plurality of posts or bosses 123 which extend from the respective sides 113 of the gear box and receive bolts 125 which pass through a clamping member 127 and through respective spacers 129. In turn, the clamping members 127 engage the hydrostatic units 77 to insure their proper assembly on the gear box 75. Further details of the gear box construction will be described after description of the hydrostatic units 77.

Each of the hydrostatic units are generally of identical conventional construction and, as shown in FIG. 4, includes a housing 133 containing (See FIG. 6) a pump assembly 135 driven by (See FIG. 4) an input shaft 137 having a male, splined outer end 139. Each hydrostatic unit 77 also includes (See FIG. 6) a motor assembly 141 which drives an output shaft 143 having its outer end machined to form a pinion 144 (See FIG. 4), and hydraulic passages 145 between the pump assembly 135 and the motor assembly 141.

The pump assembly 135 also conventionally includes a charge pump 149 and a pivotally mounted swash plate 151 which, depending upon its position, causes neutral, forward or rearward drive operation of the hydraulically connected motor assembly 141. Fixedly connected to the swash plate 151 is a control arm 153 which, when moved in one direction from a centered or neutral position, provides forward drive operation of the motor assembly 141 at a speed which increases with increasing control arm movement from the neutral position and which, when moved in the other direction from the centered or neutral position, provides reverse drive operation of the motor assembly 141 at a speed which increases with increasing movement of the control arm 153 from the neutral position.

In order to properly align the power input shaft 137 with the gear box 75, the hydrostatic unit housing 133 includes a pilot sleeve portion 157 which is concentric with the power input shaft 137 and which includes a peripheral annular groove receiving an O-ring 159 which serves as a seal. When the hydrostatic unit is assembled to the gear box, the sleeve portion 157 extends into the opening 115 and the O-ring 159 provides a seal.

In addition, the hydrostatic unit housing 133 includes (See FIG. 4) a pilot boss 161 in concentric relation to the motor output shaft 143. When the hydrostatic unit 77 is assembled to the gear box 75, the boss 161 is located in the counterbore 119 and a gasket is preferably provided therebetween to insure against a loss of oil.

Additional detailed information on the contruction of the hydrostatic units employed in the disclosed construction can be found in the Bulletin 9507 of the Sunstrand Corporation entitled "Hydrostatic Transmissions Tech Manual."

Means are provided in the gear box 75 for connecting the engine output shaft 107 to the hydrostatic unit input shafts 137. While various means can be employed, in accordance with the invention, the gear box 75 includes, as shown in FIG. 4, an input bevel gear 165 having an elongated hub 167 serving as a stub shaft which is supported by a pair of bearings, which extends exteriorly of the gear case 75 through a suitable opening, and which carries a coupling 171 connected to the engine output shaft 107. As shown in the drawings, one of the bearings 169 also serves as a thrust bearing preventing axial movement of the gear 165 outwardly of the gear box 75. In addition, a suitable sealing arrangement 173 between the gear box and the stub shaft is provided.

Within the gear box, the bevel gear 165 is in mesh with another bevel gear 177 which includes a through axial bore 179 and an elongated hub 181 supported for rotation by a combined radial and thrust bearing 183 carried by the gear box housing 111. The gear hub 181 projects exteriorly of the gear case 75 and within the sleeve portion 157 of the associated hydrostatic unit and with the splined outer end 139 of the pump assembly input shaft 137 received in the axial bore 179 of the hub 181. Rotational driving connection is afforded by providing the hub portion of the bore 179 with an internal female spline which readily receives the male spline of the hydrostatic unit upon assembly of the hydrostatic unit 77 to the gear box 75. At its other end, i.e., at the gear end of the bore, the bore is counterbored at 185 to receive one end of a cross shaft 187 which is provided at both ends with a male spline. The end of the cross shaft 187 received in the bore 179 of the gear 177, is slid into the female spline of the gear so as to rotatably couple the cross shaft 187 to the gear 177. The cross shaft 187 has an axial length such that the other end thereof is received in a collar or sleeve 189 which is, at least partially, located within the pilot sleeve portion 157 of the other hydrostatic unit 77. The collar 189 is provided with an internal female spline which drivingly receives the male splines on the adjacent ends of the cross shaft 187 and the input shaft 137 of the other hydrostatic unit 77. Thus, rotation of the input gear 165 serves to drive the pump assemblies 135 of both hydrostatic units 77 through lubricated connections in the gear box 75.

The already mentioned axle means are at least partially included in the gear box and connect the hydrostatic unit motor assemblies 141 to the respectively associated tracks 27. In this connection, when the hydrostatic units 77 are assembled to the gear box 75, the output shafts 143 extend interiorly of the gear box through the openings 117 with the pinions 144 in meshed engagement with respective gears 195 which are located within the gear box 75. The gears 195 are respectively fixed on the respective axle shafts 83 which are suitably journaled in general axial alignment by respective radial and thrust bearings 197 carried by gear case extensions or sleeves 199 which are suitably fixed as by welding or otherwise to the housing 111 and constitute portions thereof. Inwardly of their outer ends, the axle sleeves 199 have suitably fixed thereto, as by welding or otherwise, the generally upright plates 93 which respectively include ears suitably fixed, as by the bolts 91 or otherwise, to the forward ends of the forwardly open U-shaped frame member 89. During assembly of the power group 15 to the body 13, the beforementioned L-shaped closure members 85 are suitably fixed, as by screws or bolts, to both the plates 93 and to the margins of the body 13 around the body openings 55 to provide the body with watertight integrity.

It should be noted that while the lateral distance between the outer ends of the axle shafts 83 is greater than the distance between the side walls 43 of the body center section 35, the distance between the outer extremities of the deck parts 59 of the body openings 55 is greater than the lateral distance between the outer ends of the axle shafts 83. Thus, the deck parts 59 of the body openings 55 facilitate placement of the power generating and transmission group 15 in the body center section 35 and, ultimately, assembly of the power group 15 to the body 13.

At the ends of the axle sleeves 199, suitable seals 201 are provided between the sleeves 199 and the axle shafts 83 to prevent entry of dirt or moisture.

After assembly of the power group 15 to the body 13, the sprockets 25 (still to be described in detail) are keyed and fixed to the ends of the axle shafts 83. If not already assembled to the body 13, the track suspension group 17 is also assembled to the body. Thereafter, the rear bogie assemblies, still to be described, are pivoted to permit placing of the endless track 27 around the sprockets 25 and around the bogie wheels (also still to be described) with the interior lugs of the tracks between the bogie wheel discs.

From the foregoing, it is apparent that, depending upon the setting of the respective swash plates 151, input of power from the engine 73 to the gear box 75 can selectively result in forward, neutral or rearward drive conditions for each track 27.

OIL CIRCULATION SYSTEM

Figure 6:
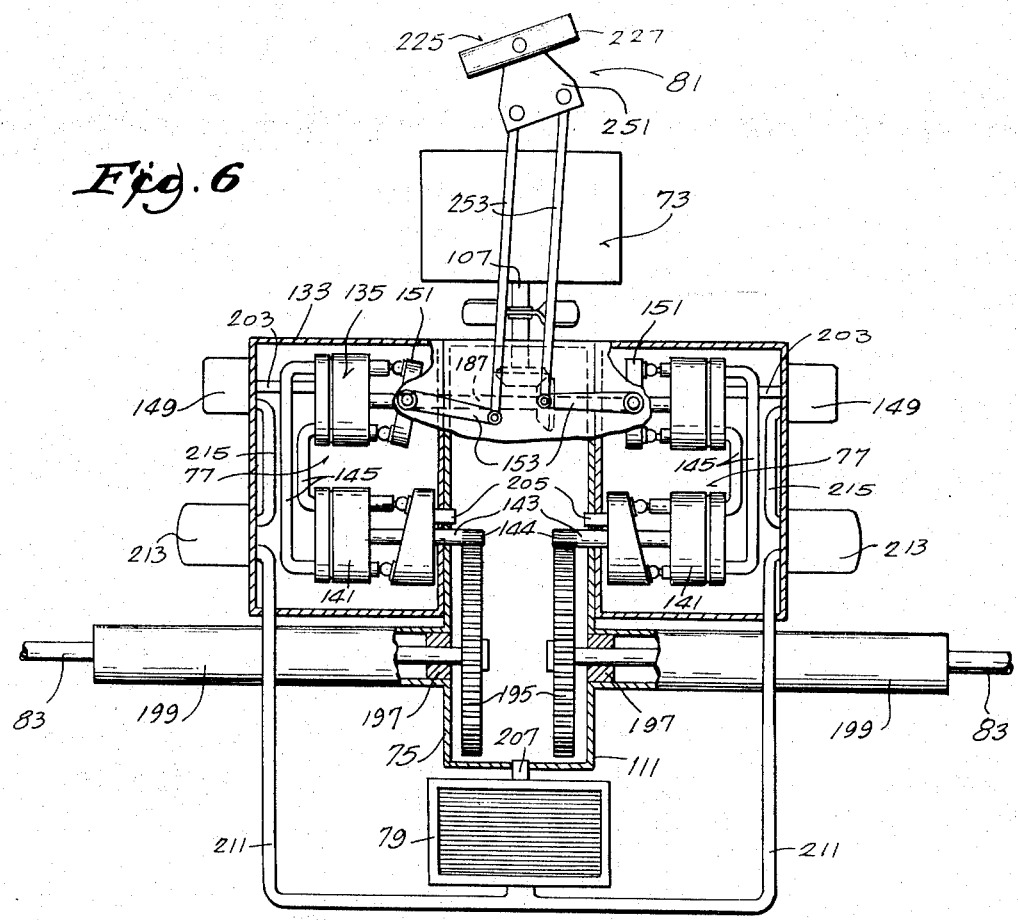
FIG. 6 is a schematic view, partially in section, of the oil circulating system included in the power generating and transmission group of the vehicle shown in FIG. 1.

The hydraulic components of the power generating and transmission group 15 are hydraulically assembled together to provide an oil circulation system which is shown diagrammatically in FIG. 6. In accordance with the invention, one of the features of the oil circulation system is the employment of the gear case 75 as a reservoir or sump for the hydraulic oil used by the hydrostatic units 77. Another of the features resides in the arrangement for providing an oil flow connection between the hydraulic motor assembly 141 of each hydrostatic unit 77 and the gear case 75. More specifically, as shown in detail in FIG. 4, oil discharged from each motor assembly 141 flows through openings 205 adjacent to the motor output shaft 143 and into the gear case 75 which, as noted, serves as a sump or reservoir. Such oil in the reservoir, serves to also lubricate the gearing and bearings in the gear box or casing 75.

Oil flows (See FIG. 6) from the gear box or case 75 through a discharge conduit or duct 207 to the radiator or heat exchanger 79 which is supported by the frame 71 above the gear case 75 in the location shown in the top portion of FIG. 3. Oil is pumped from the radiator 79 by the charge pump 149 of the hydrostatic units and through symmetrical branch lines or ducts 211 which communicate with respective filters 213 associated with the respective pump assemblies 135 of the hydrostatic units 77. Within the hydrostatic units, oil flows from the filters 213 through ducts 215 to the charge pumps 149 and thence through passages 203 to the pump assemblies 135. From the pump assemblies 135 oil flows through the internal passages 145 to the motor assemblies 141 from which the oil is dumped through the openings 205 into the reservoir or sump formed by the gear case 75 for subsequent cooling and recirculation.

HYDROSTATIC TRANSMISSION CONTROL

Figure 7:
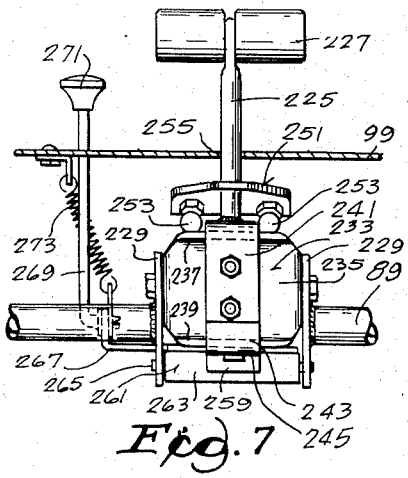
FIG. 7 is a front elevational view, partially in section, of a portion of the control for the power generating and transmission group of the vehicle shown in FIG. 1.
Figures 8, 9:
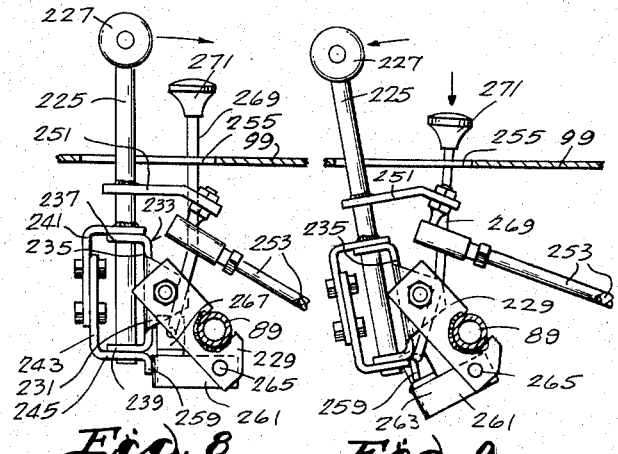
FIG. 8 is a side elevational view of the control shown in FIG. 7 with the components being shown in their neutral drive condition.
FIG. 9 is a view similar to FIG. 8 with the components being shown in their reverse drive condition.

Speed and steering control of the vehicle are provided by a control member or stick 225 (See upper left portion of FIG. 3 and FIGS. 7, 8 and 9) which has a cross bar 227 at the top and which is mounted for fore and aft rocking movement about a horizontal pivot and for rocking movement about its own axis. While various arrangements can be employed to mount the stick for movement about the just mentioned axes, in the disclosed construction, as shown in FIGS. 7, 8 and 9, the U-shaped frame member 89 has fixed thereto a pair of opposed brackets 229 which, adjacent one end thereof, pivotally support the forwardly and vertically extending legs 231 of a U-shaped bracket 233 having a web 235. Projecting rearwardly and horizontally from the web are spaced upper and lower yoke members 237 and 239 having respectively aligned apertures. Extending through the aligned apertures in the yoke members 237 and 239 for rotatational movement relative to the yoke members and to the frame 71 is the control stick 225.

Various means can be employed to prevent axial movement of the control stick 225 relative to the U-shaped bracket 233. In the disclosed construction, such means includes an upper L-shaped member 241 having one leg welded or otherwise fixed to the control stick above the upper yoke member 237 and having the other leg extending downwardly in spaced generally parallel relation to the control member 225 rearwardly of the free end of the upper yoke member 237. Connected to the free leg of the upper L-shaped member is one leg of a lower L-shaped member 243 having a second leg 245 extending perpendicularly to the control stick just below the bottom yoke member 239 and having an opening receiving the lower end of the control stick 225. Fixation of the upper L-shaped member 241 to the control stick 225 and location of the legs immediately above and below the yoke members 237 and 239 affords pivotal movement of the control stick 225 while preventing axial movement.

Above the U-shaped bracket 233, the control stick 225 is provided with a plate 251 which is inclined to the axis of the control member 225 and which has pivotal connections with a pair of links 253 which are respectively pivotally connected to the control arms 153 of the hydraulic transmission units 77. The links can be constructed as shown in U.S. Pat. application Ser. No. 821,214. When the control stick 225 is in its neutral position, the pivotal connections between the links 253 and the plate 251 are located at the same lateral distance from the axis of the control stick 225 and at the same distance from, but on opposite sides of, a fore and aft plane extending through the axis of the control stick 225.

The upper end of the control stick 225 extends through an elongated slot 255 in the dashboard 99 and, as previously mentioned, has fixed, at the very top, the cross bar 227.

In operation, forward movement of the control stick 225 will displace the links 253 forwardly so as to swing forwardly the control arms 153 of both hydrostatic transmission units 77, thereby actuating the swash plates 151 so as to provide pumping operation to effect forward drive of the motor assemblies 141. As previously noted, the speed at which the hydraulic motor assemblies 141 operate can be increased by increasing the displacement of the control arms 153 by pushing the stick 225 further forward. Pulling the stick 225 rearwardly toward the operator from a position advanced forward from the neutral position will decrease the forward speed output of the hydrostatic transmission units 77 until the neutral position of the control arms 153 is again achieved. Further rearward movement of the control stick 225 will cause the swash plates 151 to operate the hydraulic motor assemblies 141 in the reverse direction with increasing speed as the control stick 225 is displaced further rearwardly from its neutral position. Twisting of the control stick 225 about its own axis will cause differential movement of the control arms 153 such as to swing one control arm in one direction and swing the other control arm in the opposite direction, thereby operating the motor assemblies 141 at differing speeds and, possibly in different directions, so as to cause turning movement of the vehicle. If the control stick 225 is in neutral position when the control stick is twisted on its own axis, one motor assembly 141 will run in forward and the other in reverse, thereby permitting the vehicle to turn upon itself. If the control stick 225 is advanced from its neutral position, twisting of the control stick will cause one motor assembly 141 to run faster in whatever direction it was going and will cause the other motor assembly 141 to run slower in the initial direction and, perhaps, to even reverse direction.

REVERSE LOCK-OUT

The T-bar control stick 225 of the disclosed vehicle has considerable sensitivity and it can be undesirable to permit the operator to displace the control stick, without some sort of notice or interruption, from forward through neutral and into reverse. More particularly, when the operator senses that he is going too fast and wishes to slow up, it is undesirable to permit the operator to pull back on the control stick 225 to such extent as to shift into reverse drive. Accordingly, a releasable reverse drive lock-out system is provided.

In accordance with the invention, the reverse lock-out arrangement includes a downwardly extending lip 259 at the lower end of the L-shaped bracket 243 and a pivotally mounted stop member 261 having a blocking portion 263 which is normally in a blocking position in the path of lip movement upon control stick movement from neutral in the direction which effects reverse drive. More particularly, the brackets 229 which support the control stick 225 also pivotally supports the stop member 261 at 265. Fixedly connected to and forming a part of the stop member 261 is an L-shaped arm 267 which is pivotally connected at its outer end to a rod 269 which extends upwardly through a slot in the dashboard 99 and has a knob 271 at its upper end. The stop member 261 is releasably urged to the blocking position by a spring 273 which is connected to the stop member 261 and to the lower surface of the dashboard 99.

In operation, when it is desired to operate in reverse, the operator depresses the knob 271 so as to swing the block portion 263 downwardly about its pivotal support at 265 and out of the possible path of movement of the lip 259. When the block portion 263 is so depressed, the control stick 225 can then be moved to displace the lip 259 through the space previously occupied by the block portion 263 and to bring about a reverse drive condition. Continued operation in reverse drive is permitted without holding the knob 271 in depressed position because the lip 259 prevents the block portion 263 from returning to blocking position. However, when the control stick 225 is shifted back to neutral, the spring 273 automatically causes return of the block portion 263 into position preventing reverse drive operation.

THE MOTOR HOOD

After assembly of the power generating and transmission group 15 to the body 13, the power group is covered by the hood or cover 23 which includes a front hood section 279 located forwardly of the dashboard 99 and extending to almost the front of the body. As will be referred to hereinafter, the forward hood section 279 includes side walls 281 and a top wall 283, and several vents which form part of the air cooling system.

The hood 23 also includes a rear section 285 located rearwardly and underneath the dashboard. As will be described in greater detail, the rear hood section 285 also serves as a component of the air cooling system.

Any suitable means can be employed to releasably fasten the motor hood sections to the power group frame and vehicle body.

RADIATOR AND ENGINE COOLING SYSTEM

The disclosed vehicle includes a dual flow arrangement for separately inducting air for cooling of the hydraulic system and for cooling of the engine 73. More specifically, the forward motor hood section 279 has, on each side 281, a forward screened opening or air inlet 287 through which outside air is sucked or pumped interiorly of the hood 23. Supported by the frame 71 are baffle means which are provided to prevent the incoming air from flowing rearwardly or downwardly from the air inlets 287 and to convey the air solely to the top surface of the radiator 79.

More specifically, as seen in FIGS. 2, 3 and 4, such baffle means includes a vertical baffle 291 which is supported by the frame 71 and extends generally from the bottom wall 37 of the body 13 to the front hood section 279 and which divides the center body section 35 into a forward compartment containing the gear case 75 and into a rear or after compartment containing the engine 73. Such baffle means also includes (See FIG. 2) a horizontal baffle 293 which is supported by the frame 71 and/or the body 13 and which extends, forwardly from the vertical baffle 291 to the front of the body 13 and from the deck walls 49 to the radiator 79, thereby dividing the area in front of the vertical baffle 291, i.e., the forward compartment, into a lower gear case compartment and an upper inlet air compartment which conducts air from the forward air inlets 287 to the radiator 79 and which is located between the horizontal baffle 293 and the front hood section 279 and forwardly of the vertical baffle 291.

After passing through and cooling the radiator 79, the incoming air then passes downwardly into the gear case compartment and over the gear case 75. The air is then drawn (See FIG. 4) through an opening 295 in the vertical baffle 291 by a fan 297 which is concentrically arranged with the opening and which is carried on a coupling 299 connected to the engine output shaft 107 and connected through the opening 295 to the gear case coupling 171.

Air for engine cooling is drawn inwardly of the front hood section through two rearwardly located upper screened inlets 303. Such incoming air is directed rearwardly under the dashboard 99 by a baffle 305 (See upper portion of FIG. 3) which is supported by the frame 71 and extends transversely and generally horizontally rearwardly from the lower edge of the inlets 303. From under the dashboard 99, the air flows downwardly and then reversely and into the engine compartment. Rearward diffusion of the air is prevented by the rear hood section 285 which extends from the dashboard 99 to the bottom wall 37 of the center body section 35 and between the side walls 43 of the center body section. Such downward air flows past the carburetor air inlet 307 to supply combustion air to the engine 73 and is sucked toward the engine by an engine fly-wheel fan 309. Air discharged by the engine fly-wheel fan 309 travels forwardly over the engine cylinders into the forward part of the engine compartment rearwardly of the vertical baffle 291. Such incoming engine cooling air is mixed with the air delivered rearwardly from the gear case compartment through the opening 295 by the fan 297. Such intermixed air then exits from the engine compartment through rearward side vents 311 in the side walls 281 of the front hood section 279.

THE DRIVE SPROCKET

Attached to the outer ends of each of the axle shafts 83 extending from the power group 15 is one of the drive sprockets 25 which are constructed in accordance with the invention. The sprockets 25 are arranged to provide a maximum open area for discharge of snow, mud, or the like, which otherwise might collect on the inner surfaces of the drive sprocket while, at the same time, maximizing engagement of the sprocket with the track to afford effective and reliable pulling operation.

The drive sprocket shown in FIGS. 4 and 5 is constructed by welding or otherwise unitizing two sprocket sections 315 which are generally of identical construction. Each sprocket section 315 includes a hub 317 having a central keyed opening 319 affording attachment to the associated axle 83. Extending from the hub in angularly spaced relation and in radially outwardly and obliquely inclined relation to the axis of intended rotation are a plurality of spokes 321. While more than three spokes can be used, the illustrated construction including three equiangularly spaced spokes 321 is preferred, as a maximum of open area results.

Connected to the outer ends of the spokes 321 is an annular portion or member 323 which extends normal to the axis of the sprocket 25 and has an inner or side surface spaced axially from the adjacent end of the hub 317. In addition, the annular member 323 has an inner periphery spaced radially outwardly from the outer periphery of the hub. As a consequence, the sprocket 25 is open both axially and radially between the hub and the annular member to afford easy escape of debris which might otherwise tend to accumulate within and about the sprocket.

Extending axially from the annular member 323 is a circumferential series of equiangularly spaced sprocket lugs or teeth which engage the lugs on the inner surface of the track to effect track movement in response to sprocket rotation. While the number of sprocket teeth can be varied, in the disclosed construction, each sprocket section 315 includes nine teeth 325. In cross section, each of the teeth 325 is generally of half-moon shape and is located with the resulting concavity opening radially toward the hub 317.

It is to be especially noted that even when the sprocket sections 315 are assembled, as by welding together, the angularity and spacing of the spokes 321, together with the locaton of the annular members 323 offers a maximum of escape area for mud and snow. Specifically, mud and snow can exit from within the sprocket in the radially outward direction and in both axial directions.

TRACK SUSPENSION GROUP

The track suspension group 17 can be assembled independently of the body 13 and the power generating and transmission group 15 and subsequently assembled to the body 13 independently of assembly of the power generating and transmission group 15 to the body 13. In accordance with the invention, the track suspension group 17 includes a frame or support 341 having a plurality of structural cross members which are respectively and individually located in the respective downwardly open channels 45 formed in the bottom of the body. While various arrangements are possible, in the disclosed construction (See the lower portion of FIG. 3), the frame 341 includes a forward cross member 343 and an intermediate cross member 345 and a rearward cross member 347.

The cross members 343, 345 and 347 are integrated into the frame 341 by longitudinal beams. While various arrangements can be employed, in the disclosed construction, two beams 349 are employed, which beams are respectively and suitably connected to the opposite ends of the cross members 343, 345 and 347. If desired, the beams could be connected to the cross members inwardly of the ends thereof.

Figure 10:
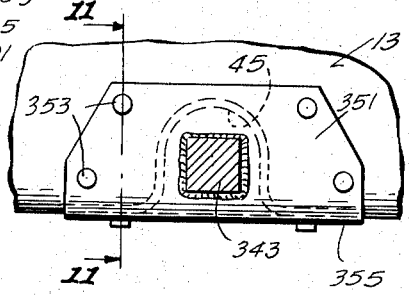
FIG. 10 is a fragmentary view, partially in section, illustrating the connection of the track suspension group to the body.
Figure 11:
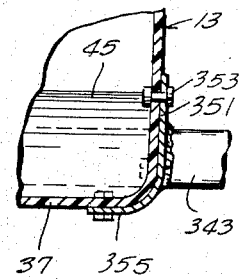
FIG. 11 is a sectional view taken along line 11—11 of FIG. 10.

The track suspension group 17 is connected to the body 13 to maintain the body watertight and so as to locate the cross members 343, 345 and 347 in the downwardly open channels 45 by means (See FIGS. 10, 11 and 12) in the form of plates 351 which are welded or otherwise fixed to the cross members and which are adapted to span the ends of the channels 45 and contact the exterior surface of the side margins around the channel ends. Suitable means, such as screws or bolts 353, applicable from the exterior, can be employed to attach the plates 351 to the side walls 43 of the body 13. In the specifically disclosed and preferred construction, two spaced plates are employed on each cross member and each plate 351 forms one leg of an L-shaped bracket having an inwardly extending leg 355 in engagement with and supporting the under-surface of the bottom wall 37 of the body 13 on each side of the applicable channel 45. The area of the plates 351 and the surface contact between the plates 351 and the body 13 is such that, even if through bolts are used to connect the plates to the body, a watertight connection can be reliably obtained and maintained. If desired, the inwardly extending legs 355 can also be bolted or otherwise fastened to the body 13.

Carried along each side of the track assembly frame 341 and under the adjacent deck wall 49 is a track suspension system. Each of the suspension systems includes inner and outer front bogie wheels 357 and 359 (See FIG. 12), intermediate inner and outer bogie wheel assemblies 363 (See bottom portion of FIG. 3), a rear bogie wheel assembly 367 and inner and outer rearward idler bogie wheels 371 and 373 (See FIG. 15). As each suspension system is identical, only one will be described.

Located at the front end of the track suspension frame 341 are the inner and outer first or front rotatable bogie wheels 357 and 359 which are separately supported in transversely adjacent and generally axially aligned relation to each other for rotational movement about their respective centers and for limited pivotal movement about the forward cross member 343. More particularly, the inner and outer bogie wheels 357 and 359 are generally of the same construction and, as shown best in FIG. 14, comprise a pair of transversely spaced discs 381 having a laterally outwardly extending thin peripheral lip 383. The discs 381 are keyed or otherwise fixed to a shaft having a central bearing 387 received in a sleeve 389 which includes, at each end, a counterbore receiving a seal member 393 which prevents entry of dirt or moisture into the bearing 387. In addition, each of the discs 381 is provided with a counterbored inwardly extending hub portion 395 which receives the end portions of the sleeve 389 to further assist in excluding dirt or moisture.

While various arrangements can be employed, in the disclosed construction, in order to permit lessening of shock upon contact of the track 27 with large obstacles and to ease passage of the vehicle over large obstacles, means are provided to support the front bogie wheels while, at the same time, affording resilient rearward swinging movement, thereby decreasing the angle of the upwardly and forwardly extending track to the ground.

As the arrangement for supporting each of the inner and outer front bogie wheels 357 and 359 is essentially the same, only the arrangement for supporting the outer front bogie wheel 359 will be described.

Figure 12:
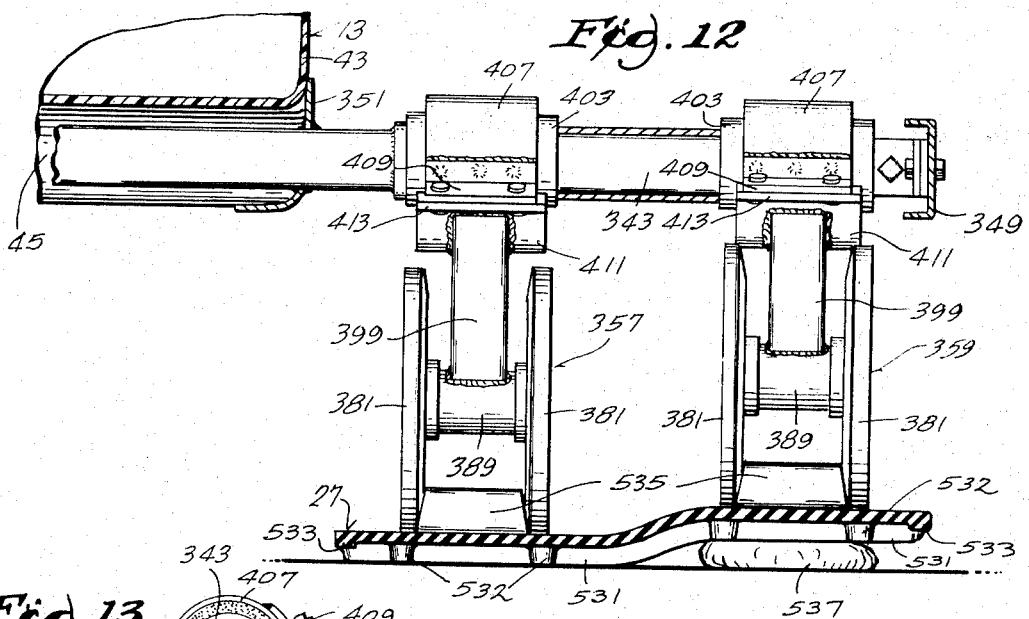
FIG. 12 is a front elevational view, partially in section, of the front bogie wheel assemblies incorporated in the track suspension group of the vehicle shown in FIG. 1.
Figure 13:
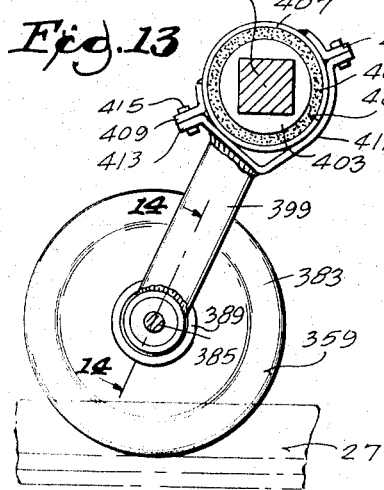
FIG. 13 is a sectional view taken along line 13—13 of FIG. 12.
Figure 14:
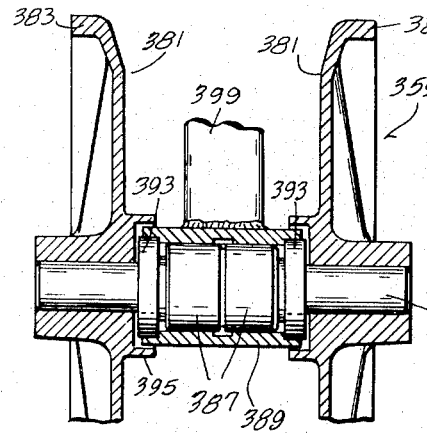
FIG. 14 is a sectional view taken along line 14—14 of FIG. 13.

More particularly in the disclosed construction, as shown in FIGS. 12, 13 and 14, the outer front bogie wheel 359 is mounted for resilient swinging movement about the axis of the front cross member 343 by means including a generally vertically extending support bar 399 and a rubber torsion bushing assembly 401. Still more particularly, the torsion bushing assembly includes an inner sleeve 403 which is telescoped onto the front cross member 343 into proper position and are suitably spaced and fixed thereto. The outer periphery of the sleeve is cylindrical and has bonded thereto a ring or annulus 405 of rubber or other rubber-like elastomeric material. Bonded to the outer cylindrical surface of the ring 405 is a cylindrical metallic jacket 407 having a pair of diametrically radially outwardly extending ears 409. The bushing assembly is received in an upwardly open cradle 411 which is welded or otherwise suitably connected to the upper end of the support bar 399 and which has a pair of diametrically extending tabs 413 which mate with the ears 409 and are suitably connected thereto, as by bolts or the like. At its lower end, the support bar 399 is welded to the bogie wheel sleeve 389.

The extent of the resilient pivotal movement permitted to the front bogie wheels 357 and 359 is determined by the torsional resistance of the rubber ring 405.

Intermediate its ends, the track suspension system further includes intermediate inner and outer bogie wheel assemblies 363 each having rotatably mounted second and third bogie wheels 419 which are generally of the same construction as the front bogie wheels and which are arranged and supported such that the axes of the inner second and third bogie wheels are generally respectively laterally aligned with respect to the axes of the outer second and third bogie wheels.

As in the case of the front bogie wheels, the intermediate inner and outer bogie wheel assemblies 363 are separately supported. Each of the intermediate inner and outer bogie wheel assemblies 363 includes means for supporting the bogie wheels for resilient up and down movement and for pivotal movement about a transverse axis located intermediate the second and third bogie wheels. The construction of the intermediate inner and outer assemblies is generally the same.

To achieve the foregoing support, the sleeves of the outer bogie wheels are suitably connected, as by clamps 423, to the ends of a leaf spring 425 which, intermediate the ends thereof, is suitably fixed, as by a clamp 427, to the web 429 of an inverted U-shaped bracket 431 having upwardly extending legs supporting a fixed pivot 433. In turn, the fixed pivot 433 is received in a bushing or sleeve 435 which is located between the bracket legs and fixed to the lower end of a post 437 depending fixedly from the intermediate cross member 345.

While separate pivots have been provided for each of the intermediate inner and outer bogie wheels assemblies 363, a single pivot member could be employed to support both inner and outer bogie wheel assemblies and still provide the same functional result. Thus, the intermediate bogie wheel assemblies 363 have independent pivotal movement about an axis extending transversely between the second and third bogie wheels and, in addition, each of the bogie wheels is supported so as to afford resilient up and down movement relative to the other bogie wheel of each assembly, as well as rotative movement about its own axis.

Supported on the rear cross member 347 is the rear bogie wheel assembly 367 which includes fourth and fifth inner rotatable bogie wheels 445 and fourth and fifth outer rotatable bogie wheels 445 which are respectively located in transversely adjacent and axially aligned relation to the fourth and fifth inner bogie wheels. Each of the inner and outer fourth and fifth bogie wheels 445 is of like construction to the front bogie wheels. The fourth and fifth outer bogie wheels are integrated into an outer bogie wheel sub-assembly 447 by a strut or rocker bar 449 which is welded or otherwise fixed at its ends to the sleeves of the fourth and fifth outer bogie wheels. A similar rocker bar 451 is fixed so as to integrate the fourth and fifth inner bogie wheels into an inner sub-assembly 453.

In order to provide for independent movement of the inner and outer bogie wheel sub-assemblies 447 and 453 so as to provide both longitudinal and transverse flexibility, the inner and outer bogie wheel sub-assemblies each include mounting means affording pivotal movement about aligned axes intermediate the fourth and fifth bogie wheels.

While various arrangements can be employed to separately afford pivotal movement for the inner and outer bogie wheel sub-assemblies 447 and 453, the arrangement for both bogie wheel sub-assemblies is the same. Only the arrangement at the outer bogie wheel assembly, as shown in FIG. 15, will be described in detail.

More particularly, the outer bogie wheel sub-assembly 447 has fixed thereto, as by welding or otherwise, a bushing or sleeve 457 which is located centrally of the associated bar 449 and which receives a pivot pin 459. In turn, the pivot pin 459 is fixed by welding or otherwise to the spaced downwardly extending legs 461 of a U-shaped bracket or connecting member 463 which straddles the sleeve 457 and which has a connecting web 465 located above the bar 449.

Also forming a part of the connecting bracket 463 is a right angle flange 467 which is welded or otherwise suitably fixed to the web 465 and which serves as a point of assembly to a cross bar or member 469 having welded, or otherwise suitably fixed to each end, a connecting plate or flange 471 which are respectively fixed, as by bolts 473, to the connecting brackets 463 associated with each of the inner and outer bogie wheel sub-assemblies 447 and 453.

Connected to the under-surface of the cross bar 469 for support thereof is a hollow tube 475 which is of rectangular cross-section and is telescoped on the rear end of a generally horizontal extending rear end portion 477 of an arm 479 which also includes a somewhat enlarged upwardly bent portion 481 connected to the rear cross member 347. Means are provided to maintain proper tension in the track. Various arrangements, including screw means can be employed. In the specifically disclosed construction, one or more shims 483 are located in telescopic relation on the rear end portion 477 of the arm 479 between the telescoping tube 475 and the upwardly inclined arm portion 481. As shown in FIG. 15, a cotter pin 485 can be employed adjacent to the rearward end of the rear end portion 477 to prevent disconnection of the telescoping tube 475 and the rearward end portion 477 of the arm 479.

In order to permit the endless tracks 27 to be slipped over the associated bogie wheels and sprockets, each rear bogie wheel assembly 367 is fixed to the rear cross member 347 so as to afford pivotal movement therebetween. While various means can be utilized to provide such pivotal construction, in the disclosed construction, the upper end of each arm 479 has fixed thereto, See FIG. 16, a bushing 491 which receives a pivot pin 493 extending between a pair of spaced parallel plates or brackets 495 suitably fixed, as by welding or otherwise, to the rear cross member 347 in adjacent outward relation to the opposed sides of the associated arm 479.

Means are provided to locate the arm 479 in proper angular relation to the rear cross member 347 and to releasably retain the arm 479 in such angular relation to the rear cross member 347. While various arrangements can be employed, in the disclosed construction, such means includes, at the rearward end of the plates 495, upper and lower bolts 497 and 499 which extend between the parallel plates above and below the arm 479 so as to confine the arm in proper angular relationship to the cross member 347. However, in order to swing the arm 479 downwardly, i.e., counterclockwise, as shown in FIG. 16, about the pivotal engagement on the pin 493, and to thereby facilitate slipping of the associated track over the sprocket and bogie wheels, the lower bolt 499 is removable.

Means are provided to establish a normal position for each of the rear bogie wheel sub-assemblies 447 and 453, to independently permit resilient pivotal movement of each sub-assembly relative to said normal position and to limit pivotal movement of each sub-assembly from the normal operating position. As the arrangement provided for each of the inner and outer bogie wheel assemblies 447 and 453 is generally identical, only the construction associated with the outer bogie wheel sub-assembly 447 will be described.

While various arrangements can be employed to establish a normal operating position and to afford resilient pivotal movement relative to said normal position, in the disclosed construction, an elastomeric or rubber mount or spring 503 is connected between the connecting flange 471 of the bogie wheel assembly cross bar 469 and the outer sub-assembly fore and aft bar 449. More particularly, the resilient mount 503 comprises a cylindrical body of rubber or other like material having imbedded therein separate threaded studs which extend from the opposite ends of the cylindrical body.

One of said studs extends through and is bolted at 505 to a forward extension 507 of the connecting flange 471 at the adjacent end of the rear bogie wheel cross bar 469. The other stud extends through and is bolted at 509 to an upright bracket 511 which is welded or otherwise fixed to the outer fore and aft beam 449 of the outer sub-assembly 447.

Accordingly, each sub-assembly 447 and 453 tends to assume a normal position in which the rubber mount 503 is not under stress. However, the rubber mount 503 will deform in shear to offer resilient pivotal movement away from the normal position and to accommodate track flexure in conformance with ground conditions.

While other means can be employed, pivotal movement from the normal position in the counterclockwise direction, as shown in FIG. 16, is essentially prevented by engagement of the rear under-surface of the web 465 with the bogie sub-assembly fore and aft beam 449. Pivotal bogie sub-assembly movement in the clockwise direction from the neutral position is limited by engagement of the sub-assembly fore and aft beam 449 with (See FIG. 15) a bent ear or tab 515 at the forward extremity of the connector flange extension 507 to which the rubber mount 503 is connected. Thus, each of the rear bogie wheel assemblies 367 includes inner and outer bogie wheel sub-assemblies 447 and 453 which provide flexible support to the track in both the longitudinal and transverse directions.

Also forming a part of each track suspension system are a pair of upper rearward inner and outer idler bogie wheels 371 and 373 which are constructed in generally the same manner as the front bogie wheels. Each of the rearward idler bogie wheels are respectively fixed (as shown best in FIGS. 15 and 16) by separate arms 521 which, at one end, are welded or otherwise suitably secured to the rear cross member 347 and, at the other end, are suitably fixed to the associated bogie wheels as by employment of respective clamps 523 encircling the respective bogie wheel sleeves.

It should be noted that, generally speaking, all of the inner bogie wheels are generally longitudinally aligned and that all of the outer bogie wheels are similarly longitudinally aligned.

THE TRACKS

Figure 18:
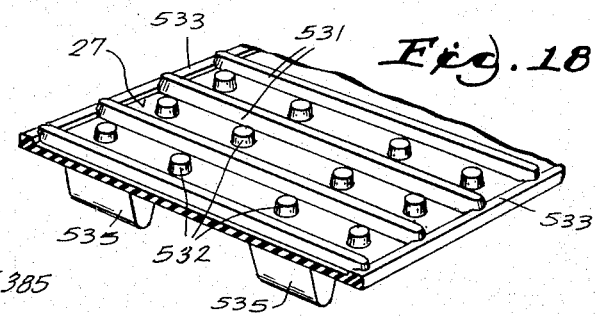
FIG. 18 is a fragmentary perspective view of a portion of the track employed on the vehicle shown in FIG. 1.

The tracks 27 are of endless construction of rubber or other similar material and include, on the outer surface, longitudinally spaced transverse treads 531 (See FIGS. 12 and 18), as well as rows of transversely spaced studs or buttons 532 which are located intermediate the transverse treads 531. In addition, the outer surface of the tracks 27 is provided along both longitudinal edges with a rib or margin 533 which is raised to an extent less than the height of the treads 531 and the studs 532. On its inner surface, each track 27 includes a pair of longitudinally extending parallel series of lugs 535 which are engaged by the sprocket teeth 325 and extend within the spaced discs 381 of the bogie wheels.

It is especially noted that the studs 532 assist the margins 533 in preventing lateral slippage of the tracks in snow or mud or the like. In addition, the studs 532 are transversely located so as to be in longitudinal alignment with the outer edges or rims 383 of the bogie wheels. Thus, the studs 532 are located in laterally outwardly adjacent relation to the lugs 535 but on the opposite side of the track. Location of the studs 532 in alignment with the rims 383 of the bogie wheel discs 381 provides a smoother, quieter ride as the studs 532 prevent any tendency toward track flexure which might otherwise occur as a consequence of travel of the bogie wheels relative to flat ground.

In general, the tracks 27 are generally unbroken to obtain the greatest possible load supporting surface and are flexible in both the longitudinal and transverse direction. Such flexibility is illustrated in FIG. 12 wherein the right side of the track is shown passing over an object 537 which does not extend for the full width of the track.

In addition, it is noted that the diameter of the bogie wheel discs 381 is so related to the size or dimensions of the lugs 535 such that, at least portion of two lugs are transversely retained within the parallel discs 381 of each bogie wheel at all times, thereby assuring proper maintenance of the track on the track suspension system.

Various of the features of the invention are set forth in the following claims.

What is claimed is:

1. A vehicle comprising a frame, an engine mounted on said frame and including a crankshaft, a gear case mounted on said frame, a pair of hydrostatic transmissions respectively detachably mounted on the opposed sides of the exterior of said gear case and each including an input shaft extending into said gear case, an output shaft extending into said gear case in parallel relation to said input shaft, a pivotally mounted swash plate to provide for swash plate movement in response to control arm movement whereby to locate said swash plate in positions affording neutral, forward and reverse drive conditions of said transmissions, power input means connected to said crankshaft exteriorly of said gear case and connected to said hydrostatic transmission input shafts interiorly of said gear case, power output means connected interiorly of said gear case to said hydrostatic transmission output shafts and including a pair of axle shafts, first and second sprockets fixed respectively on said axle shafts, first and second endless flexible tracks respectively trained about said first and second sprockets, and means for moving said control arms to provide for coordinated speed and direction control of said tracks.

2. A vehicle comprising a frame, an engine mounted on said frame and including a crankshaft, a gear case mounted on said frame, a pair of hydrostatic transmissions respectively detachably mounted on the opposed sides of the exterior of said gear case and each including an input shaft extending into said gear case, an output shaft extending into said gear case in parallel relation to said input shaft, a pivotally mounted swash plate, and a control arm connected to said swash plate to provide for swash plate movement in response to control arm movement whereby to locate said control arm and swash plate in positions affording neutral, forward and reverse drive conditions of said transmissions, power input means connected to said crankshaft exteriorly of said gear case and connected to said hydrostatic transmission input shafts interiorly of said gear case, power output means connected interiorly of said gear case to said hydrostatic transmission output shafts and including a pair of axle shafts, first and second sprockets fixed respectively on said axle shafts, first and second endless flexible tracks respectively trained about said first and second sprockets, a control member, means mounting said control member on said frame for movement about a first axis, means mounting said control member on said frame for movement about a second axis at right angles to said first axis, a pair of links connected respectively to said control arms and to said control member at the same distance from and on opposite sides of said first axis and at the same distance from and on the same side of said second axis, a stop including a blocking portion, means mounting said stop on said frame for movement of said blocking portion relative to a position in the path of control member movement about one of said axes to limit control member movement about said one axis to thereby prevent movement of said control arm to reverse drive positions, and a spring connected to said stop for biasing said blocking portion to said position.

3. A vehicle comprising a frame, an engine mounted on said frame and including a crankshaft, a gear case mounted on said frame, a pair of hydrostatic transmissions respectively detachably mounted on the opposed sides of the exterior of said gear case and each including an input shaft extending into said gear case, an output shaft extending into said gear case in parallel relation to said input shaft, a pivotally mounted swash plate, a control arm connected to said swash plate to provide for swash plate movement in response to control arm movement whereby to locate said swash plate in positions affording neutral, forward and reverse drive conditions of said transmissions, and hydraulic fluid passages, power input means connected to said crankshaft exteriorly of said gear case and connected to said hydrostatic transmission input shafts interiorly of said gear case, power output means connected interiorly of said gear case to said hydrostatic transmission output shafts and including a pair of axle shafts, a hydraulic fluid radiator mounted on said frame and including hydraulic fluid passages, a hydraulic fluid circulation system including hydraulic connections coupling said transmission passages, said radiator passages and said gear case in a closed series hydraulic circuit, first and second sprockets fixed respectively on said axle shafts, first and second endless flexible tracks respectively trained about said first and second sprockets, and means for moving said control arms to provide for coordinated speed and direction control of said tracks.

4. A vehicle comprising a gear case, an engine connected to said gear case and including a crankshaft, a pair of transmissions respectively detachably mounted on the opposed sides of the exterior of said gear case and each including an input shaft extending into said gear case, an output shaft extending into said gear case in parallel relation to said input shaft, and a control arm operable to provide neutral, forward and reverse drive conditions, power input means connected to said crankshaft exteriorly of said gear case and connected to said transmission input shafts interiorly of said gear case, and power output means connected interiorly of said gear case to said transmission output shafts and including a pair of co-axial power output shafts extending exteriorly of said gear case.

5. A vehicle in accordance with claim 4 and including a frame and wherein said gear case and said engine are mounted on said frame, wherein said pair of transmissions comprise hydrostatic transmissions each also including a pivotally mounted swash plate, and wherein said control arm is connected to said swash plate to provide for swash plate movement in response to control arm movement whereby to locate said swash plates in positions affording neutral, forward and reverse drive conditions, and further including first and second sprockets fixed respectively on said power output shafts, first and second endless flexible tracks respectively trained about said first and second sprockets, and means for moving said control arms to provide for coordinated speed and direction control of said tracks.

6. A vehicle comprising a frame, an engine mounted on said frame and including a crankshaft, a gear box mounted on said frame, a pair of hydrostatic transmissions respectively detachably mounted on the opposed sides of the exterior of said gear box and each including an input shaft extending into said gear box, an output shaft extending into said gear box in parallel relation to said input shaft, a control arm operable to provide neutral, forward and reverse drive conditions, and hydraulic fluid passages, a power input means connected to said crankshaft exteriorly of said gear box and connected to said hydrostatic transmission input shafts interiorly of said gear box, power output means connected interiorly of said gear box to said hydrostatic transmission output shafts and including power output shafts extending exteriorly of said gear box, a hydraulic fluid radiator mounted on said frame and including hydraulic fluid passages, and a hydraulic fluid circulation system including hydraulic connections coupling said transmission passages, said radiator passages and said gear box in a closed series hydraulic circuit.

7. A vehicle comprising a body including a bottom wall, a front wall extending from said bottom wall, opposed side walls extending from said bottom wall and from said front wall, a power assembly including a frame connected to said body and including a dashboard, an engine mounted on said frame below said dashboard and including an air fan arranged to direct air over said engine from the rear thereof toward the front thereof, a gear box mounted on said frame, a pair of hydrostatic transmissions detachably mounted on the exterior of said gear box and each including hydraulic passages, an input shaft extending into said gear box, an output shaft extending into said gear box in parallel relation to said input shaft, and a control arm operable to provide neutral, forward and reverse drive conditions of said transmissions, power input means extending exteriorly of said gear box and connected to said transmission input shafts interiorly of said gear box, power output means connected interiorly of said gear box to said transmission output shafts and including power output shafts extending exteriorly of said gear box, a hydraulic fluid radiator mounted on said frame and including hydraulic fluid passages, a hydraulic circulation system including hydraulic connections coupling said transmission passages, said radiator passages and said gear box in a closed series hydraulic circuit, a hood detachably connected to said body and comprising a front section including side walls and a top wall and extending forwardly of said dashboard above said power assembly and to adjacent to said body front and side walls, and a rear section extending vertically from said dashboard to said bottom wall and between said side walls, a first baffle supported by said body and located between said engine and said gear box and extending generally vertically from said bottom wall to said front hood section and between said body side walls to define a forward compartment, and a rear compartment containing said engine and closed at the rear by said rear hood section, said first baffle including an opening therein, a second baffle supported by said body and extending generally horizontally across said forward compartment from said radiator to said first baffle and to adjacent said body front and side walls to divide said forward compartment into a lower compartment containing said gear box and an upper air intake compartment, a front air inlet located in one of said front hood section side walls and communicating with said air intake compartment, an air vent located in one of said front hood section side walls and communicating with said compartment containing said engine, a rear air inlet located in said front hood section top wall, baffle means supported by said frame and extending rearwardly of said rear air inlet for conducting air from said rear air inlet rearwardly and above said engine and underneath said dashboard for communication with the rear of said compartment containing said engine, whereby air entering said rear air inlet is supplied to the rear of said compartment containing said engine and is directed forwardly over said engine by said engine fan and discharged through said air vent, coupling means connecting said engine crankshaft and said power input means exteriorly of said gear box and extending through said opening, and a fan carried by said coupling means adjacent to and concentrically with said opening, whereby air is drawn inwardly of said front air inlet, through said intake compartment, through said radiator, through said compartment containing said gear box, and through said opening into said compartment containing said engine for discharge through said air vent.

* * * * *

PO-1050
(5/69)

UNITED STATES PATENT OFFICE
CERTIFICATE OF CORRECTION

Patent No. 3,776,325  Dated December 4, 1973

Inventor(s) Herbert J. Jaspersen

It is certified that error appears in the above-identified patent and that said Letters Patent are hereby corrected as shown below:

Column 18, line 30  After "plate", insert ---,and a control arm connected to said squash plate---.

Signed and Sealed this eleventh Day of November 1975

[SEAL]

Attest:

RUTH C. MASON
Attesting Officer

C. MARSHALL DANN
Commissioner of Patents and Trademarks